(12) United States Patent
Kobayashi et al.

(10) Patent No.: US 8,996,265 B2
(45) Date of Patent: Mar. 31, 2015

(54) CONTROL DEVICE OF HYBRID VEHICLE

(75) Inventors: Nobufusa Kobayashi, Anjo (JP); Hideaki Otsubo, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/979,526

(22) PCT Filed: Jan. 12, 2011

(86) PCT No.: PCT/JP2011/050378
§ 371 (c)(1),
(2), (4) Date: Aug. 30, 2013

(87) PCT Pub. No.: WO2012/095970
PCT Pub. Date: Jul. 19, 2012

(65) Prior Publication Data
US 2014/0018207 A1  Jan. 16, 2014

(51) Int. Cl.
*B60W 20/00* (2006.01)
*B60K 6/48* (2007.10)
*B60K 6/547* (2007.10)
*B60W 10/02* (2006.01)
*B60W 10/06* (2006.01)
*B60W 10/115* (2012.01)
*B60W 30/19* (2012.01)
*B60W 30/192* (2012.01)
(Continued)

(52) U.S. Cl.
CPC ............... *B60W 20/10* (2013.01); *B60K 6/48* (2013.01); *B60K 6/547* (2013.01); *B60W 10/02* (2013.01); *B60W 10/06* (2013.01); *B60W 10/115* (2013.01); *B60W 20/40* (2013.01); *B60W 30/19* (2013.01); *B60W 30/192* (2013.01); *Y02T 10/6221* (2013.01); *F16H 61/0403* (2013.01); *B60W 2710/1011* (2013.01); *Y10S 903/902* (2013.01); *B60Y 2300/48* (2013.01); *B60Y 2200/92* (2013.01); *F16H 2312/20* (2013.01); *B60Y 2300/18016* (2013.01)
USPC .............. 701/59; 701/22; 701/68; 477/110; 477/120; 477/180; 903/902

(58) Field of Classification Search
None
See application file for complete search history.

(56) References Cited

U.S. PATENT DOCUMENTS 3,805,640 A * 4/1974 Schneider et al. ............. 477/56
4,811,223 A * 3/1989 Iwatsuki et al. ................ 701/99
(Continued)

FOREIGN PATENT DOCUMENTS

| JP | A-2004-140993 | 5/2004 |
| JP | A-2006-306210 | 11/2006 |

(Continued)

*Primary Examiner* — Ramya Burgess
*Assistant Examiner* — David Morris
(74) *Attorney, Agent, or Firm* — Oliff PLC

(57) ABSTRACT

A control device of a hybrid vehicle includes an engine and an electric motor, a clutch, and an automatic transmission. The motor is the only drive power source when the clutch is released. The control device is configured such that when a request for increasing drive torque while the motor is running is made, if start control of the engine and downshift control of the automatic transmission overlap, clutch engagement completion is a starting point to start a rotational change of an input rotation speed of the transmission toward a synchronous rotation speed after a shift, and a transmission torque capacity during the downshift control in the transmission until engagement completion of the clutch being set equal to or greater than an input torque of the transmission during the motor running and less than an input torque of the transmission at the time of engagement completion of the clutch.

7 Claims, 7 Drawing Sheets

(51) Int. Cl.
*F16H 61/04* (2006.01)

(56) References Cited

U.S. PATENT DOCUMENTS

| | | | |
|---|---|---|---|
| 7,770,678 B2* | 8/2010 | Nozaki et al. | 180/65.6 |
| 2008/0083579 A1* | 4/2008 | Okuda et al. | 180/293 |
| 2008/0228363 A1* | 9/2008 | Kouno et al. | 701/54 |

FOREIGN PATENT DOCUMENTS

| | | |
|---|---|---|
| JP | A-2008-044521 | 2/2008 |
| JP | A-2008-179242 | 8/2008 |
| JP | A-2008-207643 | 9/2008 |
| JP | A-2008-254725 | 10/2008 |
| JP | A-2010-143426 | 7/2010 |

* cited by examiner

CONTROL DEVICE OF HYBRID VEHICLE

TECHNICAL FIELD

The present invention relates to a control device of a hybrid vehicle including an engine, an electric motor coupling via a clutch to the engine, and an automatic transmission coupling to the electric motor.

BACKGROUND ART

A hybrid vehicle is well known that includes an engine and an electric motor as a drive power source for running, an engine connecting/disconnecting clutch connecting/disconnecting a power transmission path between the engine and the electric motor, and an automatic transmission coupled to the electric motor side to transmit power from the drive power source for running toward drive wheels. For example, this corresponds to hybrid vehicles described in Patent Documents 1 to 3. Such a hybrid vehicle can generally perform motor running using only the electric motor as the drive power source for running with the engine connecting/disconnecting clutch released. During the motor running, a request for switching to engine running (hybrid running) including the engine as the drive power source for running may be made along with a shift request for the automatic transmission. Various control methods are proposed for start control of the engine and downshift control of the automatic transmission provided in such a case.

For example, Patent Document 1 describes an engine start method for a hybrid drive device in which if a start request for an engine and a downshift request for an automatic transmission are made because an operation of additionally depressing an accelerator pedal is performed during motor running, a downshift of the automatic transmission is first started before starting the engine while enjoying an improvement in acceleration due to kickdown. Patent Document 2 describes a control device of a hybrid vehicle in which if a start request for an engine and a downshift request for an automatic transmission are made during motor running, the engine is first started before providing shift control. Patent Document 3 describes a control device of a hybrid vehicle in which if an accelerator opening degree becomes equal to or greater than a predetermined degree during motor running, an engine is started during downshift of a transmission with the transmission put into a neutral state during the engine start.

PRIOR ART DOCUMENTS

Patent Documents

Patent Document 1: Japanese Laid-Open Patent Publication No. 2006-306210
Patent Document 2: Japanese Laid-Open Patent Publication No. 2008-179242
Patent Document 3: Japanese Laid-Open Patent Publication No. 2008-207643

SUMMARY OF THE INVENTION

Problems to be Solved by the Invention

However, the control methods described in Patent Documents 1 and 2 may generate a two-stage shock, i.e., respective shocks generated by the engine start and the downshift, or may reduce acceleration responsiveness to depression of the accelerator pedal because of the time required for generating target drive power. Although the engine start control and the shift control are provided at the same time in the control method described in Patent Document 3, the neutral state during the shift control prevents output of drive power at least until the engine start is completed and may cause a torque decrease. If the engine start control and the shift control are provided in an overlapping manner, another problem described below may also occur. In general, since an additional depression of an accelerator pedal and an increase in transmission input torque (engine torque) are basically correlated one-to-one in a conventional vehicle including an engine and an automatic transmission, the timing of additional depression of the accelerator pedal is considered as the timing of rising of the torque, and the additional depressing operation of the accelerator pedal is used as a starting point for providing the shift control of the automatic transmission (e.g., engagement oil pressure control (torque capacity control) of a release-side clutch involved with the shift) in accordance with the transmission input torque, thereby causing the shift to proceed. However, in the case of the downshift associated with the engine start performed in the hybrid vehicle, since energy of an electric motor is partially used for the engine start, a certain amount of time is required for the engine start. Therefore, if a downshift is made with the timing of additional depression of the accelerator pedal considered as the timing of rising of the transmission input torque, engagement oil pressure control of the release-side clutch is provided and the shift is caused to proceed in accordance with a lower transmission input torque to which an engine torque is not yet added. In other words, the torque does not rise while the engine is being started and since the shift is caused to proceed in this state, torque capacity of the release-side clutch is reduced. When the engine is subsequently completely started and generates an engine torque and the transmission input torque rapidly rises in association with engagement completion of an engine connecting/disconnecting clutch, it is difficult to properly control the rising gradient of input rotation speed of the automatic transmission in accordance with the increased transmission input torque from the state in which the torque capacity of the release-side clutch is reduced and, for example, racing of the input rotation speed may occur and generate a shift shock. As described above, the control method in the case of making a start request for an engine and a downshift request for an automatic transmission at the same time during motor running still has room for improvement. The problems described above are not known and no proposal has been made on properly coordinating timings of controls when the start control of the engine and the downshift control of the automatic transmission are provided in an overlapping manner.

The present invention was conceived in view of the situations and it is therefore an object of the present invention to provide a control device of a hybrid vehicle capable of providing controls at proper timings to suppress a shift shock when start control of an engine and downshift control of an automatic transmission are provided in an overlapping manner.

Means for Solving the Problem

To achieve the object, the present invention provides (a) a control device of a hybrid vehicle including an engine and an electric motor as a drive power source for running, a clutch connecting/disconnecting a power transmission path between the engine and the electric motor, and an automatic transmission coupled to the electric motor in a power transmittable manner to transmit power from the drive power source for running toward drive wheels, the hybrid vehicle being configured to perform motor running using only the electric motor as the drive power source for running with the clutch released, wherein (b) when a request for increasing a drive torque during the motor running is made, if start control of the engine and downshift control of the automatic transmission are provided in an overlapping manner, engagement completion of the clutch is used as a starting point to start a rotational change of an input rotation speed of the automatic transmission toward a synchronous rotation speed after a shift.

Effects of the Invention

Consequently, when the request for increasing the drive torque during the motor running is made, if the start control of the engine and the downshift control of the automatic transmission are provided in an overlapping manner, the engagement completion of the clutch is used as a starting point to start the rotational change of the input rotation speed of the automatic transmission toward the synchronous rotation speed after a shift and, therefore, the engagement completion of the clutch can be considered as rising of an input torque of the automatic transmission and a shift (inertia phase) can be caused to proceed (e.g., rotation control of the input rotation speed of the automatic transmission can be provided) from the engagement completion of the clutch in response to the rising of the input torque of the automatic transmission. In other words, instead of causing the shift (inertia phase) to proceed in accordance with a lower input torque before the engagement completion of the clutch when the input torque of the automatic transmission does not yet rise, the shift can be caused to proceed in response to the input torque of the automatic transmission rising from the engagement completion of the clutch. Thus, if the start control of the engine and the downshift control of the automatic transmission are provided in an overlapping manner, controls can be provided at proper timings to suppress a shift shock.

Preferably, a transmission torque capacity in the automatic transmission during the motor running is set equal to or greater than the input torque of the automatic transmission during the motor running and less than the input torque of the automatic transmission at the time of engagement completion of the clutch. Consequently, the drive torque is properly transmitted during the motor running. At the time of engagement completion of the clutch, the automatic transmission is caused to function as a torque limiter to suppress an engagement shock (synchronization shock) of the clutch at the engine start. For example, by limiting the control of setting the transmission torque capacity in the automatic transmission during the motor running less than the input torque of the automatic transmission at the time of engagement completion of the clutch to the case of providing the start control of the engine and the downshift control of the automatic transmission in an overlapping manner, durability deterioration of the automatic transmission can be suppressed. The inertia phase is certainly started from the engagement completion of the clutch.

Preferably, the input torque of the automatic transmission during the motor running is an output torque of the electric motor required for the motor running, and the input torque of the automatic transmission at the time of engagement completion of the clutch is a combined torque of an output torque of the electric motor required for the motor running and the start of the engine and an output torque of the engine. Consequently, the transmission torque capacity in the automatic transmission during the motor running is properly set within a predetermined range (equal to or greater than the input torque of the automatic transmission during the motor running and less than the input torque of the automatic transmission at the time of engagement completion of the clutch).

Preferably, a second clutch connecting/disconnecting a power transmission path between the electric motor and the automatic transmission is further comprised, when the start control of the engine is provided, the second clutch is subjected to release or slip control, and when the downshift control of the automatic transmission is provided in addition to the start control of the engine, the second clutch is engaged. Consequently, a transmission loss can be suppressed when the downshift control of the automatic transmission is provided in addition to the start control of the engine. From another viewpoint, by limiting a range of suppressing the deterioration of transmission efficiency associated with the release or slip control of the second clutch for suppressing a shock at the engine start to the case of solely providing the start control of the engine, the shock at the engine start can be prevented from deteriorating.

Preferably, the second clutch is a lock-up clutch included in a hydraulic transmission device. Consequently, the shock at the engine start can properly be suppressed in accordance with the start control of the engine.

Preferably, start of an inertia phase in the downshift process of the automatic transmission is determined based on a differential rotation speed between a synchronous rotation speed of an input rotation speed of the automatic transmission calculated from an actual output rotation speed and a gear ratio before a shift of the automatic transmission, and an actual input rotation speed of the automatic transmission, the engagement completion of the clutch is determined by determining the start of the inertia phase. Consequently, the engagement completion of the clutch (the start of the inertia phase) is determined only with a rotation speed in the automatic transmission and, therefore, a delay in determination is hardly generated as compared to determining the engagement completion of the clutch by using a rotation speed of the engine and a rotation speed of the electric motor, for example. In other words, since the determination is made by using only a rotation sensor value related to the shift control of the automatic transmission, a delay in communication of the sensor value is hardly present and a delay in determination is hardly generated as compared to using a rotation sensor value related to control of another device. Therefore, the actual engagement completion of the clutch can be more quickly and accurately be determined. Mutual backup can be achieved with determination of engagement completion of the clutch made by using a rotation speed of another device.

Preferably, a temporal difference is stored between a time point when the engagement completion of the clutch is determined based on a differential rotation speed between an actual rotation speed of the engine and an actual rotation speed of the electric motor and a time point when the start of the inertia phase is determined to use the temporal difference as a learned value for correcting a time point when the engagement completion of the clutch is determined in the next start control of the engine. Consequently, the determination of engagement completion of the clutch can more accurately be made at the next start of the engine including the start control of the engine without the downshift control of the automatic transmission.

Preferably, the request for increasing the drive torque during the motor running corresponds to concurrent requests made as a start request for the engine associated with an increase in an accelerator opening degree and a downshift request for the automatic transmission. Consequently, if the start control of the engine and the downshift control of the automatic transmission are provided in an overlapping manner, the drive torque corresponding to an accelerator operation is properly output while a shift shock is suppressed.

MODES FOR CARRYING OUT THE INVENTION

Figure 1:
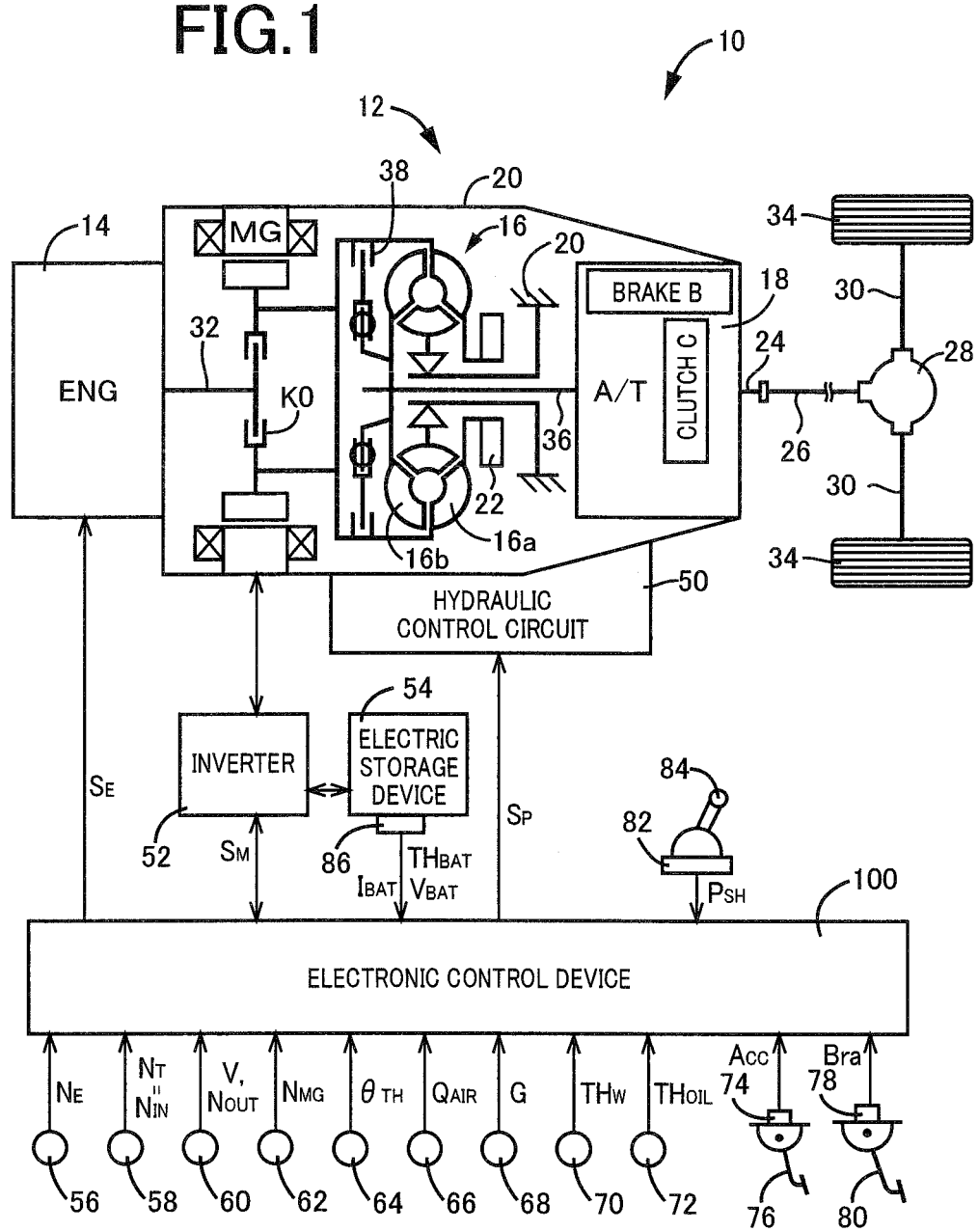
FIG. 1 is a diagram for explaining a general configuration of a power transmission path making up a hybrid vehicle to which the present invention is applied, and is a diagram for explaining a main portion of a control system disposed in the vehicle.

In the present invention, preferably, the automatic transmission is made up of a stand-alone transmission, a transmission having a hydraulic transmission device such as a torque converter, or a transmission having a sub-transmission. This transmission is made up of various planetary gear automatic transmissions having, for example, four forward speeds, five forward speeds, six forward speeds, or more shift stages with a plurality of sets of rotating elements (rotating members) of a planetary gear device selectively coupled by engagement devices to achieve a plurality of gear stages (shift stages) in an alternative manner; a synchronous meshing type parallel two-shaft automatic transmission that is a transmission including pairs of always meshing change gears between two shafts to put any of the pairs of the change gears into a power transmission state by a synchronizing device in an alternative manner and that has shift stages capable of being automatically switched by the synchronizing device driven by a hydraulic actuator; a so-called DCT (Dual Clutch Transmission) that is a synchronous meshing type parallel two-shaft automatic transmission and that is a transmission of a type having two systems of input shafts with clutches respectively linked to the input shafts of the systems and further respectively linked to even stages and odd stages; a so-called belt type continuously variable transmission having a transmission belt acting as a power transmission member wrapped around a pair of variable pulleys having a variable effective diameter so as to continuously vary a gear ratio in a stepless manner; a so-called traction type continuously variable transmission having a pair of cones rotated around a common shaft center and a plurality of rollers capable of rotating around a rotation center intersecting with the shaft center such that the rollers are interposed and pressed between the pair of the cones to change an intersection angle between the rotation center of the rollers and the shaft center so as to vary a gear ratio, etc.

Preferably, engagement devices such as multi-plate and single-plate clutches and brakes engaged by a hydraulic actuator or belt type brakes are widely used for the engagement devices of the planetary gear automatic transmission. Although an oil pump supplying operating oil for actuating the engagement devices may be an oil pump driven by, for example, a drive power source for running to discharge the operating oil, the oil pump may be driven by a dedicated electric motor etc., disposed separately from the drive power source for running.

Preferably, it is desirable in terms of responsiveness that a hydraulic control circuit including the engagement devices directly supplies, for example, an output oil pressure of a linear solenoid valve to each of hydraulic actuators (hydraulic cylinders) of the engagement devices; however, the output oil pressure of the linear solenoid valve can be used as a pilot oil pressure to control a shift control valve such that the operating oil is supplied from the control valve to the hydraulic actuators.

Preferably, the linear solenoid valves are disposed in one-to-one correspondence to each of a plurality of engagement devices, for example; however various other forms are available and, for example, if a plurality of the engagement devices exists that are not engaged or subjected to the engage/release control at the same time, a linear solenoid valve common to these devices can be disposed. The hydraulic control of all the engagement devices may not necessarily be provided by the linear solenoid valves, and the hydraulic control may partially or entirely be provided by an adjusting means other than the linear solenoid valves such as duty control of an ON-OFF solenoid valve. The phrase "supplying oil pressure" as used herein means that "causing oil pressure to act on" or "supplying operating oil controlled to the oil pressure".

Preferably, an internal combustion engine such as a gasoline engine and a diesel engine is widely used as the engine.

Preferably, a wet or dry engagement device is used as the clutch connecting/disconnecting the power transmission path between the engine and the electric motor.

An example of the present invention will now be described in detail with reference to the drawings.

FIRST EXAMPLE

FIG. 1 is a diagram for explaining a general configuration of a power transmission path from an engine 14 to drive wheels 34 making up a hybrid vehicle 10 (hereinafter referred to as a vehicle 10) to which the present invention is applied, and is a diagram for explaining a main portion of a control system disposed in the vehicle 10 for output control of the engine 14 acting as a drive power source for running, shift control of an automatic transmission 18, drive control of an electric motor MG, etc.

In FIG. 1, a vehicle power transmission device 12 (hereinafter referred to as a power transmission device 12) includes, an engine connecting/disconnecting clutch K0, the electric motor MG; a torque converter 16, an oil pump 22, an automatic transmission 18, etc., in order from the engine 14 side in a transmission case 20 (hereinafter referred to as a case 20) acting as a non-rotating member attached to a vehicle body by bolts etc. The power transmission device 12 also includes a propeller shaft 26 coupled to an output shaft 24 that is an output rotating member of the automatic transmission 18, a differential gear device (differential gear) 28 coupled to the propeller shaft 26, a pair of axles 30 coupled to the differential gear device 28, etc. The power transmission device 12 configured as described above is preferably used in the vehicle 10 of the FR (front-engine rear-drive) type, for example. In the power transmission device 12, if the engine connecting/disconnecting clutch K0 is engaged, a power of the engine 14 is transmitted from an engine coupling shaft 32 coupling the engine 14 and the engine connecting/disconnecting clutch K0, sequentially through the engine connecting/disconnecting clutch K0, the torque converter 16, the automatic transmission 18, the propeller shaft 26, the differential gear device 28, a pair of the axles 30, etc., to a pair of the drive wheels 34.

The torque converter 16 is a hydraulic transmission device transmitting a drive power input to a pump impeller 16*a* via fluid toward the automatic transmission 18. The pump impeller 16*a* is coupled sequentially through the engine connecting/disconnecting clutch K0 and the engine coupling shaft 32 to the engine 14 and is an input-side rotating element receiving the input of the drive power from the engine 14 and rotatable around an axial center. A turbine impeller 16*b* of the torque converter 16 is an output-side rotating element of the torque converter 16 and is relatively non-rotatably coupled to a transmission input shaft 36 that is an input rotating member of the automatic transmission 18 by spline fitting, etc. The torque converter 16 includes a lock-up clutch 38. The lock-up clutch 38 is a direct clutch disposed between the pump impeller 16*a* and the turbine impeller 16*b* and is put into an engaged state, a slip state, or a released state by hydraulic control etc.

The electric motor MG is a so-called motor generator having a function of a motor generating a mechanical drive power from electric energy and a function of an electric generator generating electric energy from mechanical energy. In other words, the electric motor MG may act as a drive power source for running generating a drive power for running instead of the engine 14 that is a power source or along with the engine 14. The electric motor MG also performs operations such as generating electric energy through regeneration from a drive power generated by the engine 14 or a driven power (mechanical energy) input from the drive wheels 34 side to accumulate the electric energy via an inverter 52 into an electric storage device 54. The electric motor MG is operatively coupled to the pump impeller 16*a* and power is mutually transmitted between the electric motor MG and the pump impeller 16*a*. Therefore, the electric motor MG is coupled to the transmission input shaft 36 in a power transmittable manner as is the case with the engine 14.

The oil pump 22 is a mechanical oil pump coupled to the pump impeller 16*a* and rotationally driven by the engine 14 (or the electric motor MG) to generate an operating oil pressure for providing the shift control of the automatic transmission 18, controlling a torque capacity of the lock-up clutch 38, controlling engagement/release of the engine connecting/disconnecting clutch K0, and supplying lubricant oil to the portions of the power transmission path of the vehicle 10.

The engine connecting/disconnecting clutch K0 is a wet multi-plate type hydraulic friction engagement device in which a plurality of friction plates overlapped with each other is pressed by a hydraulic actuator, for example, and is subjected to engagement/release control by a hydraulic control circuit 50 disposed in the power transmission device 12 by using an oil pressure generated by the oil pump 22 as an original pressure. In the engagement/release control, a power-transmittable torque capacity of the engine connecting/disconnecting clutch K0, i.e., an engagement force of the engine connecting/disconnecting clutch K0 is varied, for example, continuously, through pressure adjustment of a linear solenoid valve etc., in the hydraulic control circuit 50. The engine connecting/disconnecting clutch K0 includes a pair of clutch rotating members (a clutch hub and a clutch drum) relatively rotatable in the released state thereof and one of the clutch rotating members (the clutch hub) is relatively non-rotatably coupled to the engine coupling shaft 32 while the other clutch rotating member (the clutch drum) is relatively non-rotatably coupled to the pump impeller 16*a* of the torque converter 16. Because of such a configuration, the engine connecting/disconnecting clutch K0 rotates the pump impeller 16*a* integrally with the engine 14 via the engine coupling shaft 32 in the engaged state. Therefore, in the engaged state of the engine connecting/disconnecting clutch K0, the drive power from the engine 14 is input to the pump impeller 16*a*. On the other hand, in the released state of the engine connecting/disconnecting clutch K0, the power transmission between the pump impeller 16*a* and the engine 14 is interrupted. As described above, since the electric motor MG is operatively coupled to the pump impeller 16*a*, the engine connecting/disconnecting clutch K0 acts as a clutch connecting/disconnecting the power transmission path between the engine 14 and the electric motor MG. The lock-up clutch 38 acts as a second clutch connecting/disconnecting the power transmission path between the electric motor MG and the automatic transmission 18.

The automatic transmission 18 is coupled to the electric motor MG without going through the engine connecting/disconnecting clutch K0 in a power transmittable manner and makes up a portion of the power transmission path from the engine 14 to the drive wheels 34 to transmit the power from the drive power source for running (the engine 14 and the electric motor MG) toward the drive wheels 34. The automatic transmission 18 is a planetary-gear type multistage transmission acting as a stepped automatic transmission shifted to selectively establish a plurality of shift stages (gear stages) by, for example, switching any of a plurality of engagement devices, for example, hydraulic friction engagement devices such as clutches C and brakes B, to be gripped (i.e., by engagement and release of the hydraulic friction engagement devices). Therefore, the automatic transmission 18 is, for example, a stepped transmission executing a so-called clutch-to-clutch shift frequently used in known vehicles and changes the speed of the rotation of the transmission input shaft 36 to output the rotation from the output shaft 24. The transmission input shaft 36 is a turbine shaft rotationally driven by the turbine impeller 16*b* of the torque converter 16. In the automatic transmission 18, the engagement/release control of each of the clutches C and the brakes B establishes a predetermined gear stage (shift stage) depending on accelerator operation of a driver, a vehicle speed V, etc.

The clutches C and brakes B are hydraulic friction engagement devices frequently used in known vehicle automatic transmissions and are made up of wet multi-plate type clutches and brakes pressed by hydraulic actuators, a band brake fastened by a hydraulic actuator, etc. The clutches C and the brakes B configured as described above are subjected to the engagement/release control by the hydraulic control circuit 50 such that respective torque capacities, i.e., engagement forces are varied, for example, continuously, through pressure adjustment of a linear solenoid valve etc., in the hydraulic control circuit 50, thereby selectively coupling members on the both sides of the engagement devices interposed therebetween.

A torque capacity of an engagement device is determined by, for example, a friction coefficient of a friction material of the engagement device and an engagement oil pressure pressing friction plates and, to transmit a vehicle request torque that is a request torque for the vehicle 10 at the drive wheels 34 (from another viewpoint, a transmission input torque $T_{AT}$ that is a torque on the transmission input shaft 36) without a slip of the engagement device, a torque capacity is required that is equal to or greater than an assigned torque of the engagement device for the transmission input torque $T_{AT}$. In this example, a torque capacity of an engagement device may be used synonymously with an engagement oil pressure for convenience. A transmission torque capacity in the automatic transmission 18 is defined as a value acquired by converting a torque capacity of an engagement device into the torque on the transmission input shaft 36. Therefore, if a shift stage is formed by engagement of a plurality of engagement devices, the transmission torque capacity in the automatic transmission 18 is defined as a value acquired by converting a combined torque of the torque capacities of the engagement devices into the torque on the transmission input shaft 36.

Returning to FIG. 1, the vehicle 10 includes an electronic control device 100 including a control device related to a hybrid drive control, for example. The electronic control device 100 includes a so-called microcomputer including a CPU, a RAM, a ROM, and an I/O interface, for example, and the CPU executes signal processes in accordance with programs stored in advance in the ROM, while utilizing a temporary storage function of the RAM, to provide various controls of the vehicle 10. For example, the electronic control device 100 provides the output control of the engine 14, the drive control of the electric motor MG including the regenerative control of the electric motor MG, the shift control of the automatic transmission 18, the torque capacity control of the lock-up clutch 38, the torque capacity control of the engine connecting/disconnecting clutch K0, etc., and is configured separately as needed for the engine control, the electric motor control, the hydraulic control (the shift control), etc.

The electronic control device 100 is supplied with, for example, a signal indicative of an engine rotation speed $N_E$ that is the rotation speed of the engine 14 detected by an engine rotation speed sensor 56; a signal indicative of a turbine rotation speed $N_T$ of the torque converter 16 as an input rotation speed of the automatic transmission 18 detected by a turbine rotation speed sensor 58, i.e., a transmission input rotation speed $N_{IN}$ that is the rotation speed of the transmission input shaft 36; a signal indicative of a transmission output rotation speed $N_{OUT}$ that is the rotation speed of the output shaft 24 corresponding to the vehicle speed V or a rotation speed of the propeller shaft 26 as a vehicle speed related value detected by an output shaft rotation speed sensor 60; a signal indicative of an electric motor rotation speed $N_{MG}$ that is the rotation speed of the electric motor MG detected by an electric motor rotation speed sensor 62; a signal indicative of a throttle valve opening degree $\theta_{TH}$ that is an opening degree of an electronic throttle valve not depicted detected by a throttle sensor 64; a signal indicative of an intake air amount $Q_{AIR}$ of the engine 14 detected by an intake air amount sensor 66; a signal indicative of longitudinal acceleration G (or longitudinal deceleration G) of the vehicle 10 detected by an acceleration sensor 68; a signal indicative of a cooling water temperature $TH_W$ of the engine 14 detected by a cooling water temperature sensor 70; a signal indicative of an oil temperature $TH_{OIL}$ of the operating oil in the hydraulic control circuit 50 detected by an oil temperature sensor 72; a signal indicative of an accelerator opening degree Acc that is an operation amount of an accelerator pedal 76 as a drive power request amount (driver request output) for the vehicle 10 from a driver detected by an accelerator opening degree sensor 74; a signal indicative of a brake operation amount Bra that is an operation amount of a brake pedal 80 as a braking power request amount (driver request deceleration) for the vehicle 10 from a driver detected by a foot brake sensor 78; a signal indicative of a lever position (shift operation position, shift position, operation position) $P_{SH}$ of a shift lever 84, such as known "P", "N", "D", "R", and "S" positions, detected by a shift position sensor 82; and signals indicative of a battery temperature $TH_{BAT}$, a battery input/output current (battery charging/discharging current) $I_{BAT}$, and a battery voltage $V_{BAT}$ of the electric storage device 54 detected by a battery sensor 86. The electronic control device 100 sequentially calculates a state of charge (charging capacity) SOC of the electric storage device 54 based on the battery temperature $TH_{BAT}$, the battery charging/discharging current $I_{BAT}$, and the battery voltage $V_{BAT}$, for example.

The electronic control device 100 outputs, for example, an engine output control command signal $S_E$ for the output control of the engine 14; an electric motor control command signal $S_M$ for controlling the operation of the electric motor MG; and an oil pressure command signal Sp for actuating electromagnetic valves (solenoid valves) included in the hydraulic control circuit 50 for controlling the hydraulic actuators of the engine connecting/disconnecting clutch K0 and the clutches C and the brakes B of the automatic transmission 18.

Figure 2:
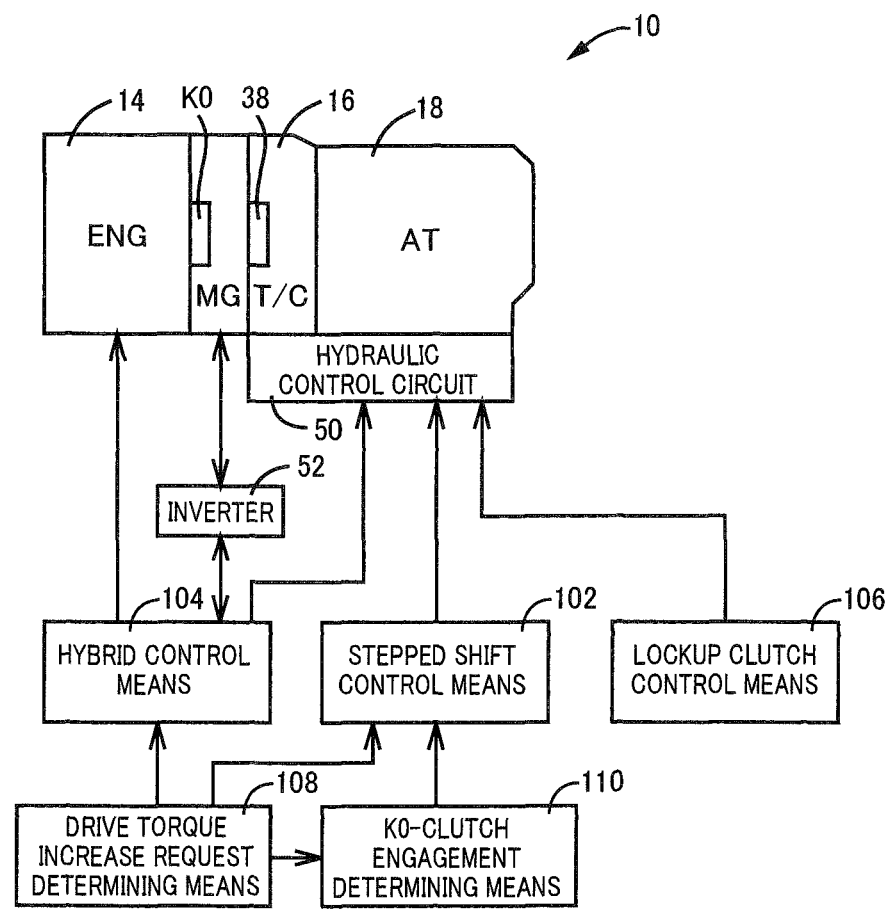
FIG. 2 is a functional block diagram for explaining a main portion of the control function of an electronic control device.

FIG. 2 is a functional block diagram for explaining a main portion of the control function of the electronic control device 100. In FIG. 2, a stepped shift control portion, i.e., a stepped shift control means 102 acts as a shift control means performing a shift of the automatic transmission 18. For example, the stepped shift control means 102 determines whether a shift of the automatic transmission 18 should be performed, i.e., determines a shift stage to be achieved by the automatic transmission 18, based on a vehicle state indicated by an actual vehicle speed V and an actual accelerator opening degree Acc from known relationship (shift diagram, shift map) having upshift lines and downshift lines stored in advance by using the vehicle speed V and the accelerator opening degree Acc (or transmission output torque $T_{OUT}$ etc.,) as variables, and provides automatic shift control of the automatic transmission 18 such that the determined shift stage is acquired. For example, if the accelerator opening degree Acc (vehicle request torque) exceeds the downshift line to be a higher accelerator opening degree (higher vehicle request torque) in association with an increase in the accelerator opening degree Acc due to an additional depression operation of the accelerator pedal 76, the stepped shift control means 102 determines that a downshift request for the automatic transmission 18 is made, and provides the downshift control of the automatic transmission 18 corresponding to the downshift line. In this case, the stepped shift control means 102 outputs to the hydraulic control circuit 50 a command (shift output command, oil pressure command) $S_P$ causing engagement and/or release of the engagement devices involved with the shift of the automatic transmission 18 such that the shift stage is achieved in accordance with a predetermined engagement operation table stored in advance, for example. The hydraulic control circuit 50 actuates the linear solenoid valves in the hydraulic control circuit 50 to actuate the hydraulic actuators of the engagement devices involved with the shift such that the shift of the automatic transmission 18 is performed by, for example, releasing a release-side engagement device (release-side clutch) and engaging an engagement-side engagement device (engagement-side clutch) in accordance with the command $S_P$.

A hybrid control portion, i.e., a hybrid control means 104 has a function as an engine drive control means controlling the drive of the engine 14 and a function as an electric motor operation control means controlling the operation of the electric motor MG as a drive power source or an electric generator through the inverter 52, and provides control of the hybrid drive by the engine 14 and the electric motor MG etc., through these control functions. For example, the hybrid control means 104 calculates a vehicle request torque from the accelerator opening degree Acc and the vehicle speed V and controls the drive power source for running so as to achieve an output torque of the drive power source for miming (the engine 14 and the electric motor MG) such that the vehicle request torque is acquired in consideration of a transmission loss, an accessory load, a shift stage of the automatic transmission 18, a charging capacity SOC of the electric storage device 54, etc.

More specifically, for example, if the vehicle request torque is within a range that can be covered by only an output torque (electric motor torque) $T_{MG}$ of the electric motor MG, the hybrid control means 104 sets the running mode to a motor running mode (hereinafter, EV mode) and performs a motor running (EV running) using only the electric motor MG as the drive power source for running. On the other hand, for example, if the vehicle request torque is within a range that cannot be covered unless at least the output torque (engine torque) $T_E$ of the engine 14 is used, the hybrid control means 104 sets the running mode to a hybrid running mode (hereinafter, HV mode) and performs a hybrid running (HV running) using at least the engine 14 as the drive power source for running.

The vehicle request torque is obviously a drive torque during a driving period while the engine 14 side rotationally drives the drive wheel 34 side, and also includes a braking torque, i.e., a driven torque, corresponding to target deceleration G* during a driven period while the drive wheel 34 side rotationally drives the engine 14 side (the electric motor MG side). Therefore, the vehicle request torque is a positive torque during the driving period and is a negative torque during the driven period. The vehicle request torque can be converted into the transmission output torque $T_{OUT}$, which is a torque on the output shaft 24, the transmission input torque $T_{AT}$, which is a torque on the transmission input shaft 36, or an input torque of the power transmission device 12, which is a torque input to the pump impeller 16a. Therefore, the transmission output torque $T_{OUT}$, the transmission input torque $T_{AT}$, the input torque of the power transmission device 12, etc., are usable as the vehicle request torque, in addition to the output torque at the drive wheels 34. The accelerator opening degree Acc, the throttle valve opening degree $\theta_{TH}$, the intake air amount $Q_{AIR}$, etc., are also usable as the vehicle request torque.

If the EV running is performed, the hybrid control means 104 releases the engine connecting/disconnecting clutch K0 to interrupt the power transmission path between the engine 14 and the torque converter 16 and causes the electric motor MG to output the electric motor torque $T_{MG}$ required for the motor running. On the other hand, if the HV running is performed, the hybrid control means 104 engages the engine connecting/disconnecting clutch K0 to transmit the drive power from the engine 14 to the pump impeller 16a and causes the electric motor MG to output an assist torque as needed.

If the vehicle request torque is increased due to, for example, the additional depression operation of the accelerator pedal 76 during the EV running and the electric motor torque $T_{MG}$ required for the EV running corresponding to the vehicle request torque exceeds a predetermined EV running torque range in which the EV running can be performed, the hybrid control means 104 switches the running mode from the EV mode to the HV mode and starts the engine 14 to perform the HV running. At this start of the engine 14, while engaging the engine connecting/disconnecting clutch K0 toward the complete engagement, the hybrid control means 104 rotationally drives the engine 14 by transmitting an engine start torque $T_{MG}s$ for engine start from the electric motor MG via the engine connecting/disconnecting clutch K0 and starts the engine 14 by controlling engine ignition, fuel supply, etc., while the engine rotation speed $N_E$ is raised to a predetermined rotation or higher. After the engine 14 is started, the hybrid control means 104 promptly achieves the complete engagement of the engine connecting/disconnecting clutch K0.

As described above, the electric motor MG is allowed to function as an engine starter motor. Therefore, the electric motor torque $T_{MG}$ at the engine start during the EV running is a total torque of an EV running torque $T_{MG}ev$ transmitted as a torque required for the EV running toward the automatic transmission 18 and the engine start torque $T_{MG}s$ transmitted as a torque required for the engine start toward the engine 14. Therefore, during the EV running, it is desirable to operate the electric motor MG such that power is reserved for the engine start torque $T_{MG}s$ in preparation for the engine start. From another viewpoint, during the EV running, the predetermined EV running torque range is defined as a torque range equal to or lower than a torque acquired by subtracting the engine start torque $T_{MG}s$ from a current maximum electric motor torque $T_{MG}max$ that can be output by the electric motor MG; and the electric motor MG is desirably operated within the predetermined EV running torque range. Therefore, if the EV running torque $T_{MG}ev$ corresponding to the vehicle request torque exceeds the predetermined EV running torque range during the EV running, a start request for the engine 14 (hereinafter, engine start request) is made. Therefore, if a request value of the EV running torque $T_{MG}ev$ corresponding to the vehicle request torque exceeds the predetermined EV running torque range in association with an increase in the accelerator opening degree Acc (vehicle request torque) due to an additional depression operation of the accelerator pedal 76 during the EV running, the hybrid control means 104 determines that the engine start request is made, and starts the engine 14. The engine start torque $T_{MG}s$ may be, for example, a uniform value stored in advance or may be a value calculated based on the cooling water temperature $TH_w$ of the engine 14 from a predetermined relationship stored in advance.

At the time of engine start by the hybrid control means 104, a lock-up clutch control portion, i.e., a lock-up clutch control means 106 controls the lock-up clutch 38 of the torque converter 16 into a released or slip state so as to suppress generation of shock.

If the accelerator opening degree Acc (vehicle request torque) is increased due to, for example, the additional depression operation of the accelerator pedal 76 during the EV running, concurrent requests may be made as the engine start request and the downshift request for the automatic transmission 18 depending on a vehicle state. As a result, during the EV running, the start control of the engine 14 (hereinafter, engine start control) by the hybrid control means 104 and the downshift control of the automatic transmission 18 by the stepped shift control means 102 are performed in an overlapping manner. However, if the engine start control and the downshift control are provided in an overlapping manner during the EV running, since the electric motor torque $T_{MG}$ is partially used for the engine start control, a certain amount of time is required for starting the engine 14 and raising the engine torque $T_E$. Therefore, if a downshift is made with the timing of additional depression of the accelerator pedal considered as the timing of rising of the transmission input torque $T_{AT}$ as in the case of, for example, providing only the downshift control during the HV running, the shift may be caused to proceed in accordance with a lower transmission input torque $T_{AT}$ to which the engine torque $T_E$ is not yet added, and the torque capacity of the release-side clutch may be reduced too much. After the start of the engine 14, when the transmission input torque $T_{AT}$ rapidly rises in association with the complete engagement of the engine connecting/disconnecting clutch K0, it is difficult to properly control the rising gradient of the transmission input rotation speed $N_{IN}$ in accordance with the rapidly increased transmission input torque $T_{AT}$ and, for example, racing of the transmission input rotation speed $N_{IN}$ may occur and generate a shift shock.

Therefore, if the engine start control and the downshift control are provided in an overlapping manner during the EV running, the electronic control device 100 of this example uses the engagement completion (complete engagement) of the engine connecting/disconnecting clutch K0 as the starting point, instead of using the additional depression operation of the accelerator pedal 76 as the starting point, to start the shift control provided in an inertia phase in the downshift process of the automatic transmission 18, i.e., a rotational change of the transmission input rotation speed $N_{IN}$ toward a synchronous rotation speed after the shift.

The electronic control device 100 sets a transmission torque capacity in the automatic transmission 18 during the EV running before engagement completion of the engine connecting/disconnecting clutch K0 equal to or greater than a transmission input torque $T_{AT}$ during the EV running and less than a transmission input torque $T_{AT}$ at the time of engagement completion of the engine connecting/disconnecting clutch K0. The transmission input torque $T_{AT}$ during the EV running is the EV running torque $T_{MG}$ev of the electric motor MG required for the EV running, for example. The transmission input torque $T_{AT}$ at the time of engagement completion of the engine connecting/disconnecting clutch K0 is a combined torque of the electric motor torque $T_{MG}$ and the engine torque $T_E$, which is a total torque of the EV running torque $T_{MG}$ev and the engine start torque $T_{MG}$S. For example, the transmission input torque $T_{AT}$ at the time of engagement completion of the engine connecting/disconnecting clutch K0 is a combined torque of the electric motor torque $T_{MG}$ and the engine torque $T_E$ predicted at the time of engagement completion of the engine connecting/disconnecting clutch K0. In particular, the torque capacity of the release-side clutch during the EV running is set such that the EV running torque $T_{MG}$ev is certainly transmitted toward the drive wheels 34 during the EV running before engagement completion of the engine connecting/disconnecting clutch K0 and such that a slip occurs in the release-side clutch in the automatic transmission 18 at the time of engagement completion of the engine connecting/disconnecting clutch K0. As a result, the inertia phase in the downshift process of the automatic transmission 18 certainly starts from the engagement completion of the engine connecting/disconnecting clutch K0.

More specifically, a drive torque increase request determining portion, i.e., a drive torque increase request determining means 108 determines whether a request for increasing a drive torque is made during the EV running. For example, based on whether concurrent requests are made as an engine start request and a downshift request for the automatic transmission 18 due to an additional depression operation of the accelerator pedal 76 during the EV running, the drive torque increase request determining means 108 determines whether the request for increasing the drive torque is made during the EV running.

If the drive torque increase request determining means 108 determines that the request for increasing the drive torque is made during the EV running, a K0-clutch engagement determining portion, i.e., a K0-clutch engagement determining means 110 determines whether the engine connecting/disconnecting clutch K0 is completely engaged in association with the engine start control by the hybrid control means 104. Therefore, the K0-clutch engagement determining means 110 determines the engagement completion of the engine connecting/disconnecting clutch K0. For example, based on whether a differential rotation speed $\Delta N_{K0}$ ($=N_{MG}-N_E$) between the actual engine rotation speed $N_E$ and the actual electric motor rotation speed $N_{MG}$ becomes equal to or less than a predetermined differential rotation $\Delta N_{K0}'$, the K0-clutch engagement determining means 110 determines the engagement completion of the engine connecting/disconnecting clutch K0. The predetermined differential rotation $\Delta N_{K0}'$ is a maximum threshold value obtained and stored in advance for determining that the engine connecting/disconnecting clutch K0 is completely engaged if the differential rotation speed is equal to or less than the value, for example.

In this example, if the engine start control and the downshift control are provided in an overlapping manner during the EV miming, the inertia phase in the downshift process of the automatic transmission 18 starts from the engagement completion of the engine connecting/disconnecting clutch K0 and, therefore, the engagement completion of the engine connecting/disconnecting clutch K0 may be determined by determining the start of the inertia phase. For example, the K0-clutch engagement determining means 110 calculates a pre-shift synchronous rotation speed $N_{IN}b$ ($=N_{OUT} \times \gamma_{AT}$[before shift]) of the transmission input rotation speed $N_{IN}$ from the actual transmission output rotation speed $N_{OUT}$ and a predetermined gear ratio (gear ratio) $\gamma_{AT}$ stored in advance corresponding to a shift stage of the automatic transmission 18 before a shift. Based on whether a differential rotation speed $\Delta N_{IN}$ ($=N_{IN}-N_{IN}b$) between the pre-shift synchronous rotation speed $N_{IN}b$ of the transmission input rotation speed $N_{IN}$ and the actual transmission input rotation speed $N_{IN}$ becomes equal to or greater than a predetermined differential rotation $\Delta N_{IN}'$, the K0-clutch engagement determining means 110 determines the start of the inertia phase as the determination of the engagement completion of the engine connecting/disconnecting clutch K0. The predetermined differential rotation $\Delta N_{IN}'$ is a minimum threshold value that is preliminarily calculated and stored, and is used to determine that the start of the inertia phase occurs when the differential rotation value is equal to or greater than the predetermined differential rotation $\Delta N_{IN}'$.

If the drive torque increase request determining means 108 determines that the request for increasing the drive torque is made during the EV running, the stepped shift control means 102 sets a clutch pressure command value of the release-side clutch to an inertia phase start preparation pressure at the time of provision of the downshift control until the K0-clutch engagement determining means 110 determines that the engine connecting/disconnecting clutch K0 is completely engaged. Therefore, when a downshift is made along with engine start, the stepped shift control means 102 keeps the clutch pressure of the release-side clutch lower and waiting at the inertia phase start preparation pressure, instead of reducing the clutch pressure in accordance with the transmission input torque $T_{AT}$, until the engine connecting/disconnecting clutch K0 is completely engaged. This inertia phase start preparation pressure is an assigned torque of the release-side clutch corresponding to a transmission torque capacity of the automatic transmission 18 required for transmission of the transmission input torque $T_{AT}$ equal to or greater than the actual EV running torque $T_{MG}$ev (i.e., the electric motor torque $T_{MG}$ when the engine start torque $T_{MG}$s is not added) and less than a combined torque of the electric motor torque $T_{MG}$ (=EV running torque $T_{MG}$ev+ engine start torque $T_{MG}$S) and the engine torque $T_E$ predicted at the time of engagement completion of the engine connecting/disconnecting clutch K0. The actual EV running torque $T_{MG}$ev is calculated by the electronic control device 100 based on the electric motor control command signal $S_M$ to the electric motor MG during the EV running, for example. The electric motor torque $T_{MG}$ predicted at the time of engagement completion of the engine connecting/disconnecting clutch K0 is calculated by the electronic control device 100 as, for example, a total torque of the actual EV running torque $T_{MG}$ev and the engine start torque $T_{MG}$S added to the actual EV running torque $T_{MG}$ev for engine start. The engine torque $T_E$ predicted at the time of engagement completion of the engine connecting/disconnecting clutch K0 is calculated by the electronic control device 100 based on the accelerator opening degree Acc when the drive torque increase request determining means 108 determines that a request for increasing a drive torque is made during the EV running, from a relationship (predicted engine torque map) empirically obtained and set in advance between a predicted engine torque value at the time of engagement completion of the engine connecting/disconnecting clutch K0 for the engine torque $T_E$ rising in accordance with the accelerator opening degree Acc after engine ignition and the accelerator opening degree Acc, for example.

If the K0-clutch engagement determining means 110 determines that the engine connecting/disconnecting clutch K0 is completely engaged, the stepped shift control means 102 sets the clutch pressure command value of the release-side clutch to a value corresponding to a transmission input torque $T_{AT}$ predicted after engagement completion of the engine connecting/disconnecting clutch K0 based on the engine torque $T_E$ rising in accordance with the accelerator opening degree Acc after engine ignition obtained and set in advance, thereby causing a downshift (inertia phase) to proceed. Therefore, the stepped shift control means 102 uses the engagement completion of the engine connecting/disconnecting clutch K0 as the starting point to start, as feedforward control based on the predicted transmission input torque $T_{AT}$, the shift control provided in the inertia phase in the downshift process of the automatic transmission 18, i.e., the control of setting the clutch pressure command value of the release-side clutch so as to make a rotational change of the transmission input rotation speed $N_{IN}$ toward a synchronous rotation speed after the shift (i.e., post-shift synchronous rotation speed $N_{IN}$a (=$N_{OUT} \times \gamma_{AT}$[after shift])) at a predetermined gradient. Therefore, as compared to setting the clutch pressure command value of the release-side clutch in accordance with the actual transmission input torque $T_{AT}$ rapidly rising after the engagement completion of the engine connecting/disconnecting clutch K0, a delay in response of the clutch pressure of the release-side clutch to the transmission input torque $T_{AT}$ is suppressed. Thus, for example, the racing of the transmission input rotation speed $N_{IN}$ relative to the predetermined gradient is suppressed. The predetermined gradient represents a form of rotational change of the transmission input rotation speed $N_{IN}$ in the inertia phase empirically obtained and set in advance for satisfying both the suppression of shift shock and the shift responsiveness (shift progression), for example. However, this is merely feedforward control based on the predicted transmission input torque $T_{AT}$ and the transmission input rotation speed $N_{IN}$ may not be able to be changed at the predetermined gradient. Therefore, the stepped shift control means 102 may provide feedback control to suppress a rotation speed difference between a target value of the transmission input rotation speed $N_{IN}$ for achieve the predetermined gradient and an actual value of the transmission input rotation speed $N_{IN}$ in addition to the feedforward control.

Figure 3:
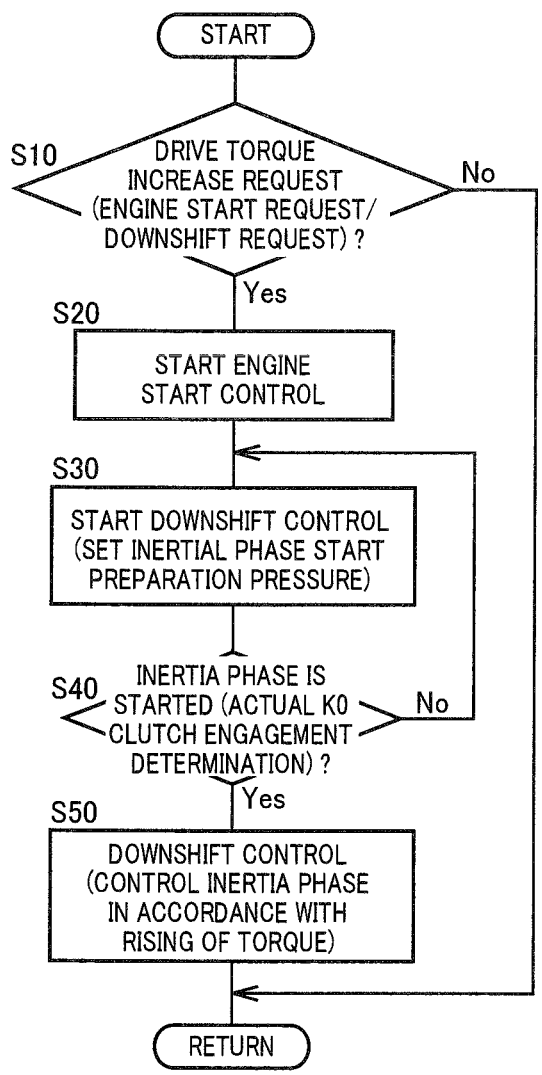
FIG. 3 is a flowchart for explaining a main portion of the control operation of the electronic control device, i.e., a control operation for providing controls at proper timings to suppress a shift shock when start control of an engine and downshift control of an automatic transmission are provided in an overlapping manner.
Figure 4:
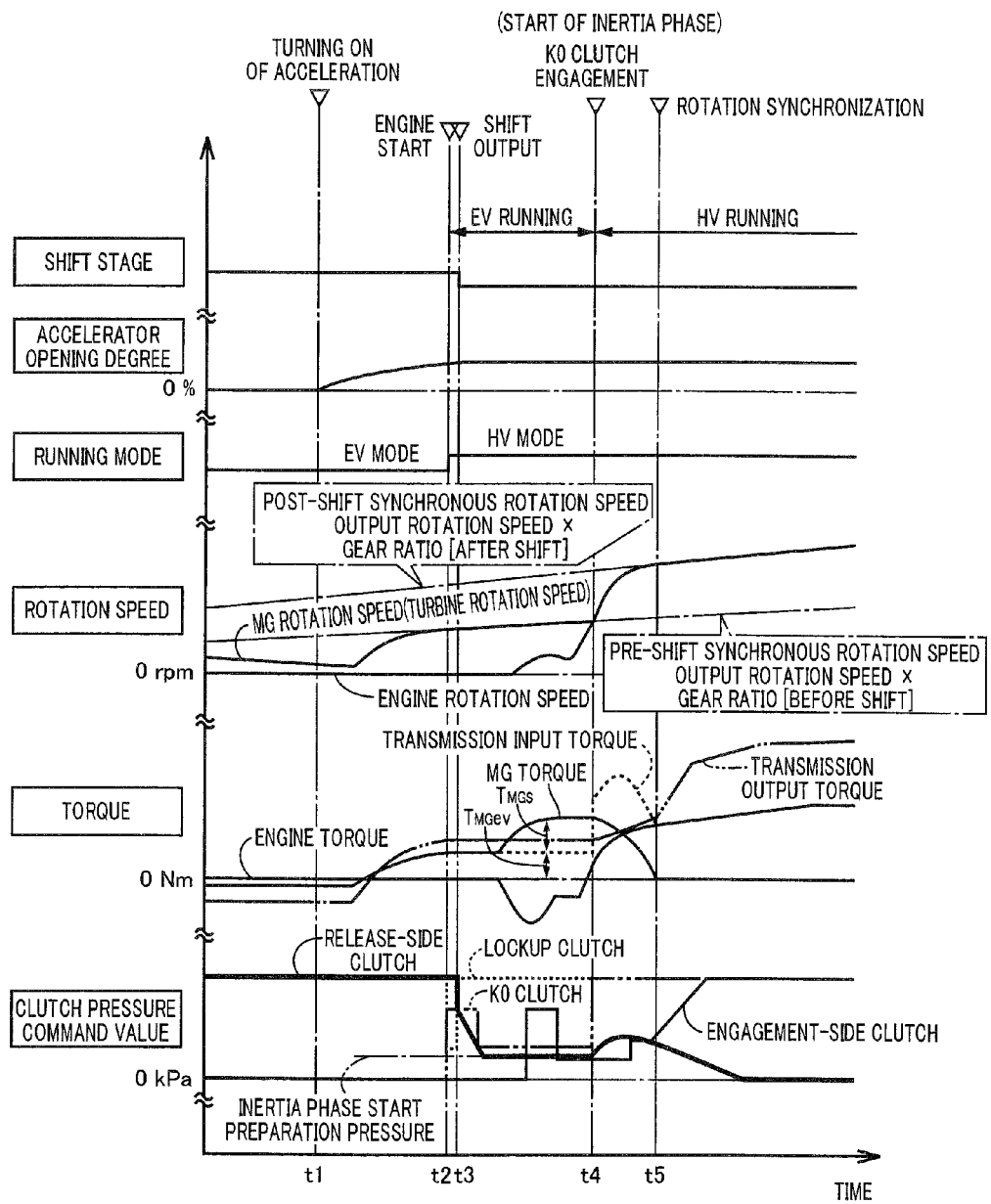
FIG. 4 is a time chart when the control operation depicted in the flowchart of FIG. 3 is performed.

FIG. 3 is a flowchart for explaining a main portion of the control operation of the electronic control device 100, i.e., a control operation for providing controls at proper timings to suppress a shift shock when the engine start control and the downshift control are provided in an overlapping manner and is repeatedly executed with an extremely short cycle time, for example, on the order of few msec to a few tens of msec. FIG. 4 is a time chart when the control operation depicted in the flowchart of FIG. 3 is performed.

In FIG. 3, first, at step (hereinafter, step will be omitted) S10 corresponding to the drive torque increase request determining means 108, for example, it is determined whether the request for increasing the drive torque is made during the EV running, i.e., whether concurrent requests are made as the engine start request and the downshift request for the automatic transmission 18 due to the additional depression operation of the accelerator pedal 76 (after time t1 of FIG. 4) during the EV running. If the determination at S10 is negative, this routine is terminated, and if affirmative, at S20 corresponding to the hybrid control means 104, for example, the engine start control is started (time t2 of FIG. 4). At S30 corresponding to the stepped shift control means 102, for example, the downshift control is started (time t3 of FIG. 4). In this downshift control, first, the clutch pressure command value of the release-side clutch is set to the inertia phase start preparation pressure (after time t3 of FIG. 4). At S40 corresponding to the K0-clutch engagement determining means 110, for example, it is determined whether the engine connecting/disconnecting clutch K0 is completely engaged in association with the engine start control. In other words, it is determined whether the inertia phase in the downshift process of the automatic transmission 18 is started. If the determination at S40 is negative, the operation is returned to S30, and if affirmative, at S50 corresponding to the stepped shift control means 102, for example, the downshift control in the inertia phase is provided, i.e., inertia phase control corresponding to rising of the transmission input torque $T_{AT}$ is provided as feedforward control based on the predicted transmission input torque $T_{AT}$ (after time t4 of FIG. 4).

In FIG. 4, when concurrent requests are made as the engine start request and the downshift request (time t2 of FIG. 4) in association with turning on of acceleration (time t1 of FIG. 4), the engine start torque $T_{MG}$s is added to the EV running torque $T_{MG}$ev as the electric motor torque $T_{MG}$ for engine start (time t2 to time t4 of FIG. 4). Since the transmission input torque $T_{AT}$ does not rise as indicated by a broken line during this period of the engine start control, the clutch pressure command value of the release-side clutch (bold solid line) is set to the inertia phase start preparation pressure and the release-side clutch pressure is kept waiting at a lower pressure (time t3 to time t4 of FIG. 4). When the engine connecting/disconnecting clutch K0 is completely engaged, the transmission input torque $T_{AT}$ rapidly rises as indicated by a broken line and, therefore, the clutch pressure command value of the release-side clutch (bold solid line) corresponding to the predicted transmission input torque $T_{AT}$ is set such that a rotational increase of the transmission input rotation speed $N_{IN}$ is achieved from this point at the predetermined gradient toward the post-shift synchronous rotation speed $N_{IN}$a (after time t4 of FIG. 4). In the example of FIG. 4, the clutch pressure command value of the release-side clutch is once increased from the inertia phase start preparation pressure in accordance with the transmission input torque $T_{AT}$. The clutch pressure command value of the engagement-side clutch is promptly incremented from a constant standby pressure toward the maximum value for complete engagement immediately before the transmission input rotation speed $N_{IN}$ is rotationally synchronized with the post-shift synchronous rotation speed $N_{IN}$a (time t5 of FIG. 4) or after the synchronization of rotation.

As described above, according to this example, if the engine start control and the downshift control of the automatic transmission 18 are provided in an overlapping manner when the request for increasing the drive torque is made during the EV running, the engagement completion of the engine connecting/disconnecting clutch K0 is used as a starting point to start a rotational change of the transmission input rotation speed $N_{IN}$ toward the post-shift synchronous rotation speed $N_{IN}$a and, therefore, the engagement completion of the engine connecting/disconnecting clutch K0 can be considered as the rising of the transmission input torque $T_{AT}$ and the downshift (inertia phase) can be caused to proceed (e.g., the rotation control of the transmission input rotation speed $N_{IN}$ can be provided) from the engagement completion of the engine connecting/disconnecting clutch K0 in response to the rising of the transmission input torque $T_{AT}$. In other words, instead of causing the downshift (inertia phase) to proceed in accordance with a lower transmission input torque $T_{AT}$ before the engagement completion of the engine connecting/disconnecting clutch K0 when the transmission input torque $T_{AT}$ does not yet rise, the downshift can be caused to proceed in response to the transmission input torque $T_{AT}$ rising from the engagement completion of the engine connecting/disconnecting clutch K0. Thus, if the engine start control and the downshift control of the automatic transmission 18 are provided in an overlapping manner, the controls can be provided at proper timings to suppress a shift shock.

According to this example, since a transmission torque capacity in the automatic transmission 18 during the EV running is set equal to or greater than the transmission input torque $T_{AT}$ during the EV running and less than the transmission input torque $T_{AT}$ at the time of engagement completion of the engine connecting/disconnecting clutch K0, the drive torque is properly transmitted during the EV running. At the time of engagement completion of the engine connecting/disconnecting clutch K0, the automatic transmission 18 is caused to function as a torque limiter to suppress an engagement shock (synchronization shock) of the engine connecting/disconnecting clutch K0 at the engine start. For example, by limiting the control of setting the transmission torque capacity in the automatic transmission 18 during the EV running less than the transmission input torque $T_{AT}$ at the time of engagement completion of the engine connecting/disconnecting clutch K0 to the case of providing the engine start control and the downshift control of the automatic transmission 18 in an overlapping manner, durability deterioration of the automatic transmission 18 can be suppressed. The inertia phase is certainly started from the engagement completion of the engine connecting/disconnecting clutch K0.

According to this example, since the transmission input torque $T_{AT}$ during the EV running is the electric motor torque $T_{MG}$ required for the EV running and the transmission input torque $T_{AT}$ at the time of engagement completion of the engine connecting/disconnecting clutch K0 is a combined torque of the electric motor torque $T_{MG}$ required for the EV running and the engine start and the engine torque $T_E$, the transmission torque capacity in the automatic transmission 18 during the EV running is properly set within a predetermined range (equal to or greater than the transmission input torque $T_{AT}$ during the EV running and less than the transmission input torque $T_{AT}$ at the time of engagement completion of the engine connecting/disconnecting clutch K0).

According to this example, since the request for increasing the drive torque during the EV running corresponds to concurrent requests made as an engine start request associated with an increase in the accelerator opening degree Acc and a downshift request for the automatic transmission 18, if the engine start control and the downshift control of the automatic transmission 18 are provided in an overlapping manner, the drive torque corresponding to an accelerator operation is properly output while a shift shock is suppressed.

Other examples of the present invention will be described. In the following description, the portions common to the examples are denoted by the same reference numerals and will not be described.

SECOND EXAMPLE

In the first example, the K0-clutch engagement determining means 110 determines whether the engine connecting/disconnecting clutch K0 is completely engaged, based on the differential rotation speed $\Delta N_{K0}$ ($=N_{MG}-N_E$) between the actual engine rotation speed $N_E$ and the actual electric motor rotation speed $N_{MG}$ or by determining the start of the inertia phase in the downshift process of the automatic transmission 18 based on the differential rotation speed $\Delta N_{IN}$ ($=N_{IN}-N_{IN}$b) between the actual transmission input rotation speed $N_{IN}$ and the pre-shift synchronous rotation speed $N_{IN}$b. As a result, electric signals sent from various sensors are used for the determination of engagement completion of the engine connecting/disconnecting clutch K0. Therefore, some electric signals used may have a delay in communication and cause a delay in determination. Thus, the determination of engagement completion of the engine connecting/disconnecting clutch K0 is desirably made with signals causing a smaller delay in determination.

For example, it is assumed that the determination of engagement completion of the engine connecting/disconnecting clutch K0 is made by a control device AT related to the shift control of the automatic transmission 18. The transmission input rotation speed N and the transmission output rotation speed $N_{OUT}$, i.e., the basis of the pre-shift synchronous rotation speed $N_{IN}$b, are originally used in the control device AT related to the shift control of the automatic transmission 18 and hardly cause a delay in transmission. On the other hand, the engine rotation speed $N_E$ and the electric motor rotation speed $N_{MG}$ are used by, for example, a control device ENG related to the output control of the engine 14 and a control device MG related to the drive control of the electric motor MG and are likely to cause a delay in communication when transmitted via the control device ENG or the control device MG to the control device AT as compared to the transmission input rotation speed $N_{IN}$ and the transmission output rotation speed $N_{OUT}$. Therefore, in such a case, the K0-clutch engagement determining means 110 may determine whether the engine connecting/disconnecting clutch K0 is completely engaged, by determining the start of the inertia phase in the downshift process of the automatic transmission 18 based on the differential rotation speed $\Delta N_{IN}$ between the actual transmission input rotation speed $N_{IN}$ and the pre-shift synchronous rotation speed $N_{IN}$b.

In such a case, the determination of engagement completion of the engine connecting/disconnecting clutch K0 based on the differential rotation speed $\Delta N_{K0}$ between the actual engine rotation speed $N_E$ and the actual electric motor rotation speed $N_{MG}$ can be used for backup of the determination of start of the inertia phase based on the differential rotation speed $\Delta N_{IN}$ between the actual transmission input rotation speed $N_{IN}$ and the pre-shift synchronous rotation speed $N_{IN}$b (e.g., backup for the time of failure and the confirmation of determination).

A temporal difference (time lag) $\Delta t_{k0}$ ($=t_{IN}-t_{K0}$) may be stored between time $t_{K0}$ at which the engagement completion of the engine connecting/disconnecting clutch K0 is determined based on the differential rotation speed $\Delta N_{K0}$ and time $t_{IN}$ at which the start of the inertia phase is determined based on the differential rotation speed $\Delta N_{IN}$, and the temporal difference $\Delta t_{k0}$ may be used as a learned value to correct the time of determination of the engagement completion of the engine connecting/disconnecting clutch K0 in the next start control of the engine 14. For example, in the engine start control without the downshift control of the automatic transmission 18, the start of the inertia phase cannot be determined based on the differential rotation speed $\Delta N_{IN}$ and, therefore, the time of engagement completion of the engine connecting/disconnecting clutch K0 determined based on the differential rotation speed $\Delta N_{K0}$ is corrected based on the temporal difference $\Delta t_{k0}$.

Figure 5:
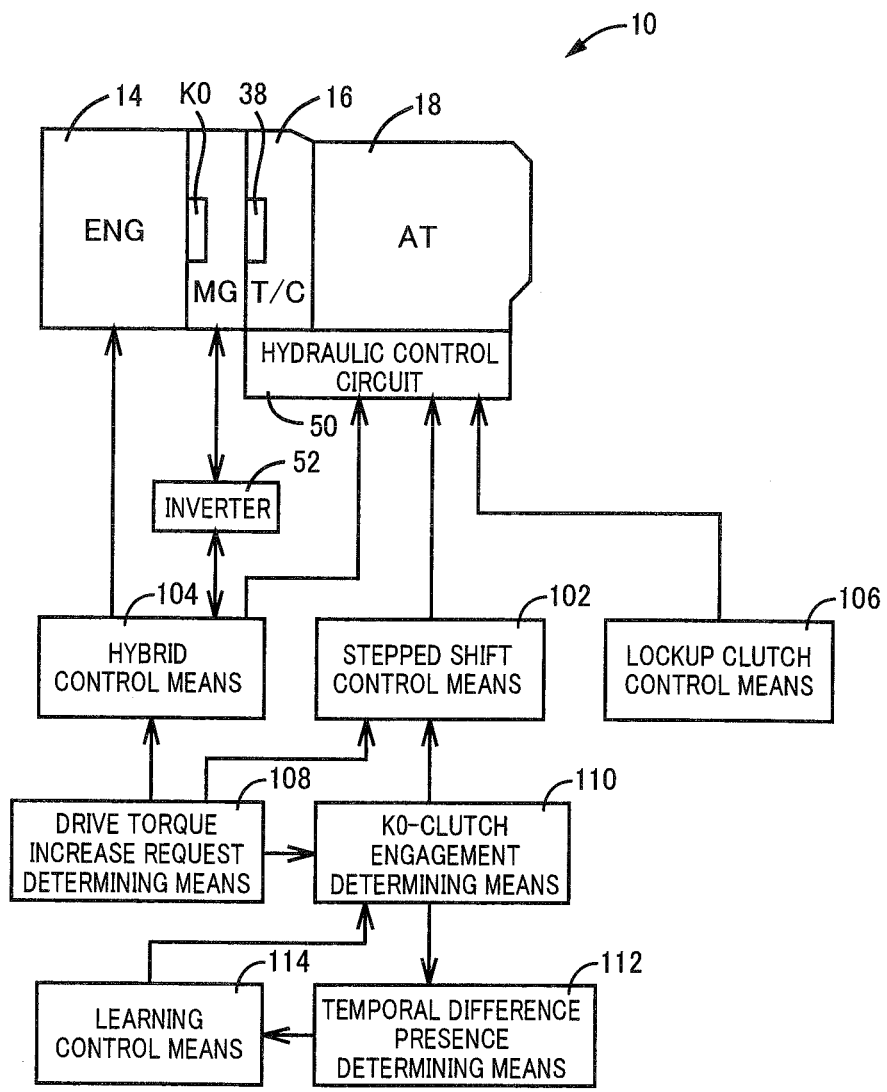
FIG. 5 is a functional block diagram for explaining a main portion of the control function of the electronic control device and depicts another example corresponding to the functional block diagram of FIG. 2.

More specifically, FIG. 5 is a functional block diagram for explaining a main portion of the control function of the electronic control device 100 and depicts another example corresponding to the functional block diagram of FIG. 2. In FIG. 5, a temporal difference presence determining portion, i.e., a temporal difference presence determining means 112 determines whether the temporal difference $\Delta t_{k0}$ equal to or greater than a predetermined temporal difference is present between the time $t_{K0}$ at which the engagement completion of the engine connecting/disconnecting clutch K0 is determined based on the differential rotation speed $\Delta N_{K0}$ by the K0-clutch engagement determining means and the time t at which the start of the inertia phase is determined based on the differential rotation speed $\Delta N_{IN}$ by the K0-clutch engagement determining means. The predetermined temporal difference is a temporal difference determination value obtained and set in advance for determining that the temporal difference $\Delta t_{k0}$ is at the level at which the time of engagement completion of the engine connecting/disconnecting clutch K0 must be corrected through learning control.

If the temporal difference presence determining means 112 determines that the temporal difference $\Delta t_{k0}$ equal to or greater than the predetermined temporal difference is present, a learning control portion, i.e., a learning control means 114 stores the temporal difference $\Delta t_{k0}$ as a learned value into a memory (storage device) not depicted. Subsequently, for example, when the engine start control is solely provided without the downshift control, if the K0-clutch engagement determining means 110 determines whether the engine connecting/disconnecting clutch K0 is completely engaged based on the differential rotation speed $\Delta N_{K0}$, the learning control means 114 uses the temporal difference $\Delta t_{k0}$ as a learned value to correct the time of determination of the engagement completion of the engine connecting/disconnecting clutch K0. The temporal difference $\Delta t_{k0}$ used as the learned value may be overwritten with and stored as the latest learned value or may be stored for each type of shift (such as a downshift from 2 to 1 and a downshift from 3 to 2).

Figure 6:
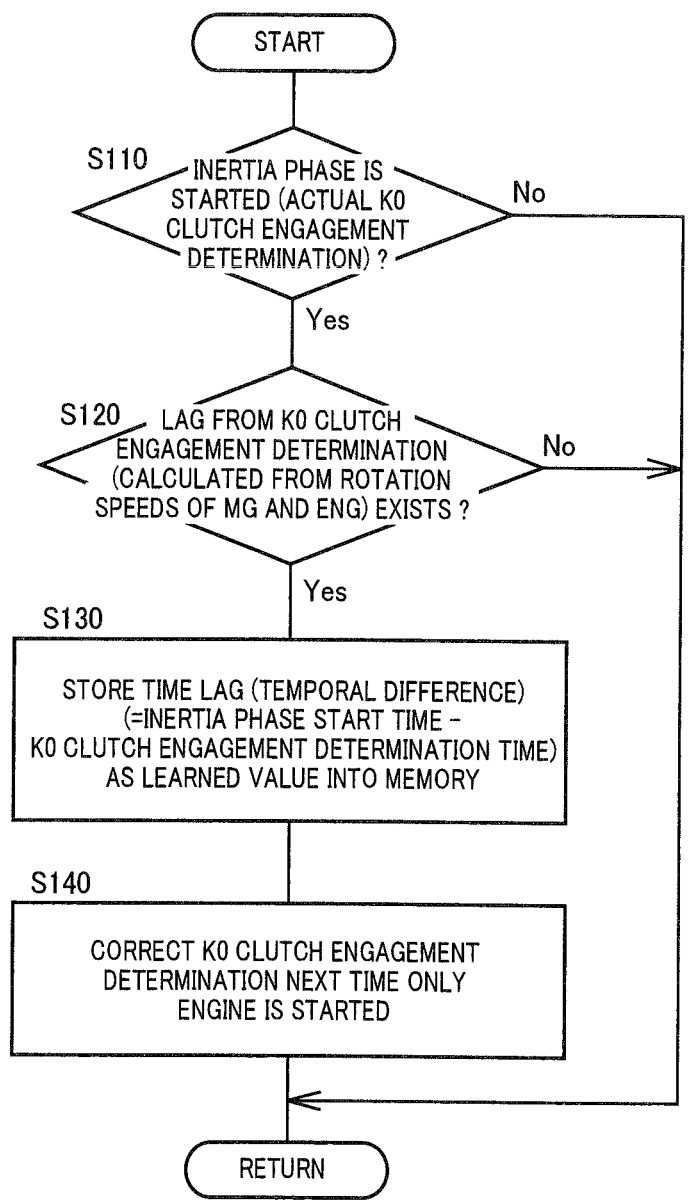
FIG. 6 is a flowchart for explaining a main portion of the control operation of the electronic control device, i.e., a control operation for providing learning control of the time of determination of engagement completion of an engine connecting/disconnecting clutch.

FIG. 6 is a flowchart for explaining a main portion of the control operation of the electronic control device 100, i.e., a control operation for providing the learning control of the time of determination of the engagement completion of the engine connecting/disconnecting clutch K0 and is repeatedly executed with an extremely short cycle time, for example, on the order of few msec to a few tens of msec. The flowchart of FIG. 6 is executed in addition to the flowchart of FIG. 3 in the first example, for example.

In FIG. 6, first, at step S110 corresponding to the K0-clutch engagement determining means 110, for example, it is determined whether the engine connecting/disconnecting clutch K0 is completely engaged in association with the engine start control. If the determination at S110 is negative, this routine is terminated, and if affirmative, at S120 corresponding to the temporal difference presence determining means 112, for example, it is determined whether the temporal difference $\Delta t_{k0}$ equal to or greater than the predetermined temporal difference is present between the time $t_{K0}$ at which the engagement completion of the engine connecting/disconnecting clutch K0 is determined and the time $t_{IN}$ at which the start of the inertia phase is determined. If the determination at S120 is negative, this routine is terminated, and if affirmative, at S130 corresponding to the learning control means 114, for example, the temporal difference $\Delta t_{k0}$ is stored as a learned value into a memory (storage device) not depicted. At S140 corresponding to the learning control means 114, for example, when the engine start control is solely provided without the downshift control, the temporal difference $\Delta t_{k0}$ considered as a learned value is used for correcting the time of determination of the engagement completion of the engine connecting/disconnecting clutch K0 determined based on the differential rotation speed $\Delta N_{K0}$.

As described above, according to this example, in addition to the effects of the example, the engagement completion of the engine connecting/disconnecting clutch K0 is determined by determining the start of the inertia phase in the downshift process of the automatic transmission 18 based on the differential rotation speed $\Delta N_{IN}$ between the actual transmission input rotation speed $N_{IN}$ and the pre-shift synchronous rotation speed $N_{IN}$b and, therefore, the engagement completion of the engine connecting/disconnecting clutch K0 (the start of the inertia phase) is determined only with the rotation speed in the automatic transmission 18. Thus, a delay in determination is hardly generated as compared to determining the engagement completion of the engine connecting/disconnecting clutch K0 by using the engine rotation speed $N_E$ and the electric motor rotation speed $N_{MG}$, for example. In other words, since the determination is made by using only a rotation sensor value related to the shift control of the automatic transmission 18, a delay in communication of the sensor value is hardly present and a delay in determination is hardly generated as compared to using a rotation sensor value related to control of another device. Therefore, the actual engagement completion of the engine connecting/disconnecting clutch K0 can be more quickly and accurately be determined. Mutual backup can be achieved with determination of the engine connecting/disconnecting clutch K0 made by using a rotation speed of another device.

According to this example, since the temporal difference $\Delta t_{k0}$ is stored between the time $t_{K0}$ at which the engagement completion of the engine connecting/disconnecting clutch K0 is determined based on the differential rotation speed $\Delta N_{K0}$ and the time $t_{IN}$ at which the start of the inertia phase is determined based on the differential rotation speed $\Delta N_{IN}$, and the temporal difference $\Delta t_{k0}$ is used as a learned value to correct the time of determination of the engagement completion of the engine connecting/disconnecting clutch K0 in the next start control of the engine 14, the determination of engagement completion of the engine connecting/disconnecting clutch K0 can more accurately be made at the next start of the engine including the start control of the engine 14 without the downshift control of the automatic transmission 18.

THIRD EXAMPLE

In the first example, the lock-up clutch control means 106 controls the lock-up clutch 38 of the torque converter 16 into the released or slip state so as to suppress the generation of shock when the engine is started by the hybrid control means 104. As described above, if the downshift control of the automatic transmission 18 is provided in addition to the engine start control, the automatic transmission 18 is caused to function as a torque limiter at the time of engagement completion of the engine connecting/disconnecting clutch K0 to suppress an engagement shock (synchronization shock) of the engine connecting/disconnecting clutch K0 at the engine start. Therefore, if the downshift control of the automatic transmission 18 is provided in addition to the engine start control, the lock-up clutch 38 of the torque converter 16 may be controlled into a completely engaged state (lockup-on state). This leads to the suppression of transmission loss associated with putting the lock-up clutch 38 into the released or slip state.

Figure 7:
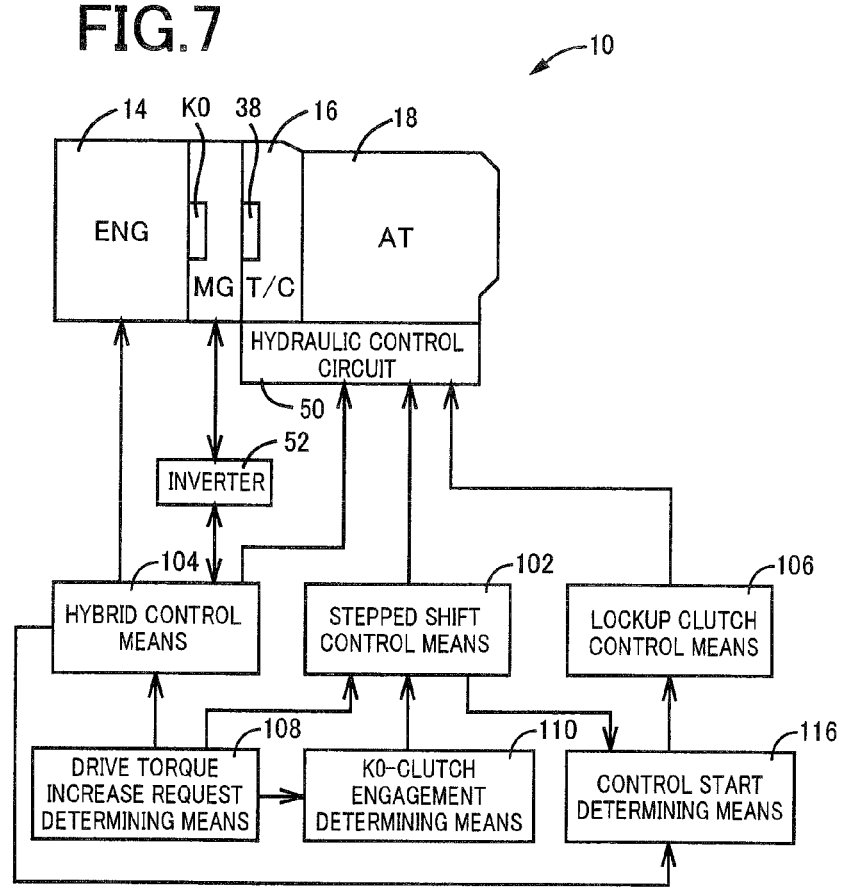
FIG. 7 is a functional block diagram for explaining a main portion of the control function of the electronic control device and depicts another example corresponding to the functional block diagram of FIG. 2.

More specifically, FIG. 7 is a functional block diagram for explaining a main portion of the control function of the electronic control device 100 and depicts another example corresponding to the functional block diagram of FIG. 2. In FIG. 7, a control start determining portion, i.e., a control start determining means 116 determines whether the engine start control is started by the hybrid control means 104. The control start determining means 116 determines whether the downshift control of the automatic transmission 18 is started by the stepped shift control means 102.

If the control start determining means 116 determines that the engine start control is started, the lock-up clutch control means 106 controls the lock-up clutch 38 of the torque converter 16 into the released or slip state. On the other hand, when the drive torque increase request determining means 108 determines that a request for increasing the drive torque is made during the EV running, if the control start determining means 116 determines that the downshift control of the automatic transmission 18 is started, the lock-up clutch control means 106 controls the lock-up clutch 38 of the torque converter 16 into the lockup-on state.

Figure 8:
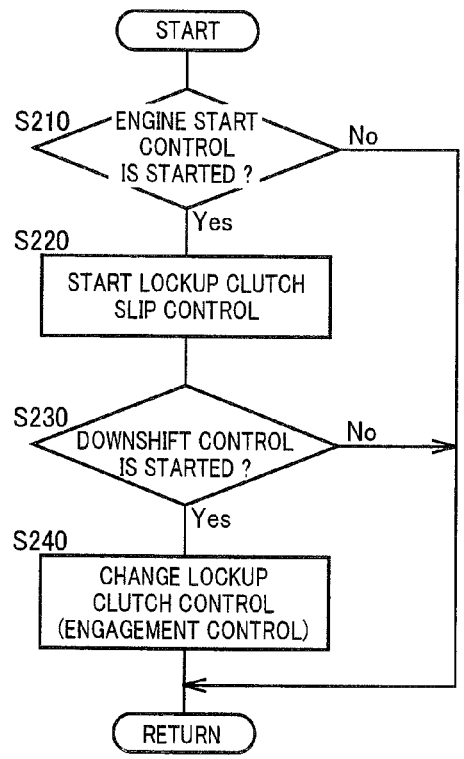
FIG. 8 is a flowchart for explaining a main portion of the control operation of the electronic control device, i.e., a control operation for properly controlling a lock-up clutch.

FIG. 8 is a flowchart for explaining a main portion of the control operation of the electronic control device 100, i.e., a control operation for properly controlling the lock-up clutch 38 and is repeatedly executed with an extremely short cycle time, for example, on the order of few msec to a few tens of msec. The flowchart of FIG. 8 is executed in addition to the flowchart of FIG. 3 in the first example, for example.

In FIG. 8, first, at S210 corresponding to the control start determining means 116, for example, it is determined whether the engine start control is started. If the determination at S210 is negative, this routine is terminated, and if affirmative, at S220 corresponding to the lock-up clutch control means 106, for example, the lock-up clutch 38 is controlled into the released or slip state. At S230 corresponding to the control start determining means 116, for example, it is determined whether the downshift control of the automatic transmission 18 is started. If the determination at S230 is negative, this routine is terminated, and if affirmative, at S240 corresponding to the lock-up clutch control means 106, for example, the lock-up clutch 38 is controlled and switched from the released or slip state to the lockup-on state. As depicted in the time chart of FIG. 4 of the first example, when the engine start control is started, the lock-up clutch 38 is controlled into the released or slip state (time t2 of FIG. 4). When the downshift control of the automatic transmission 18 is started, the lock-up clutch 38 is switched from the released or slip state to the lockup-on state (time t3 of FIG. 4).

As described above, according to the present example, since the lock-up clutch 38 is controlled into the released or slip state when the engine start control is provided and the lock-up clutch 38 is engaged when the downshift control of the automatic transmission 18 is provided in addition to the engine start control, a transmission loss can be suppressed when the downshift control of the automatic transmission 18 is provided in addition to the engine start control. From another viewpoint, by limiting a range of suppressing the deterioration of transmission efficiency associated with the release or slip control of the lock-up clutch 38 for suppressing a shock at the engine start to the case of solely providing the engine start control, the shock at the engine start can be prevented from deteriorating. By properly controlling the lock-up clutch 38 in accordance with the engine start control and the downshift control, the shock at the engine start can properly be suppressed.

Although the examples of the present invention have been described in detail with reference to the drawings, the present invention can be implemented by combining the examples with each other and is also applied in other forms.

For example, although each of the examples is independently implemented in the examples described above, each of the examples may not necessarily independently be implemented and may be implemented in a combined manner as needed.

In the second example, the transmission input rotation speed $N_{IN}$ and the transmission output rotation speed $N_{OUT}$ are exemplarily illustrated as rotation speeds hardly having a delay in communication and whether the engine connecting/disconnecting clutch K0 is completely engaged is determined by determining the start of the inertia phase based on the differential rotation speed $\Delta N_{IN}$; however, this is not necessarily a limitation. For example, if the engine rotation speed $N_E$ and the electric motor rotation speed $N_{MG}$ hardly have a delay in communication as compared to the transmission input rotation speed $N_{IN}$ and the transmission output rotation speed $N_{OUT}$, the engagement completion of the engine connecting/disconnecting clutch K0 may be determined based on the differential rotation speed $\Delta N_{K0}$. In short, a sensor value having a relatively smaller delay in communication may preferentially be used for making the determination.

Although the lock-up clutch 38 is exemplarily illustrated as the second clutch connecting/disconnecting the power transmission path between the electric motor MG and the automatic transmission 18 in the examples, this is not a limitation and the second clutch may be an engagement device solely included in a power transmission path such as the engine connecting/disconnecting clutch K0, for example.

Although the case of providing the engine start control and the downshift control of the automatic transmission 18 in an overlapping manner is exemplarily illustrated in the examples, the present invention may be applied to the case of providing the engine start control and the upshift control of the automatic transmission 18 in an overlapping manner.

Although the engagement devices engaged for forming a shift stage of the automatic transmission 18 are hydraulic friction engagement devices such as the clutches C and the brakes B in the examples, this is not a limitation and the engagement devices may be other engagement devices of the electromagnetic type, the magnetic particle type, etc., such as electromagnetic clutches, powder (magnetic particle) clutches, and meshing-type dog clutches, for example. Although the automatic transmission 18 is an automatic transmission subjected to the shift control to a shift stage determined based on a running state from a shift map, this is not a limitation and the transmission may be a manual transmission shifted to a shift stage based only on a driver's operation, for example.

Although the vehicle request torque can be not only an output torque at the drive wheels 34 converted from the vehicle request output calculated from the accelerator opening degree Acc and the vehicle speed V but also the transmission output torque $T_{OUT}$, the transmission input torque $T_{AT}$, the input torque of the power transmission device 12, etc., that can be converted from the vehicle request torque in the examples, this is not necessarily a limitation. For example, the vehicle request torque can be the transmission output torque $T_{OUT}$, the transmission input torque $T_{AT}$, etc., converted from the engine torque $T_E$ calculated such that the vehicle request output can be acquired, or can be a torque value directly detected by using a torque sensor.

Although the torque converter 16 is used as a hydraulic transmission device in the examples, the torque converter 16 may not necessarily be disposed and another hydraulic transmission device such as a fluid coupling (fluid coupling) without a torque amplification effect may be used instead of the torque converter 16.

The description is merely an embodiment and the present invention may be implemented in variously modified and improved forms based on the knowledge of those skilled in the art.

NOMENCLATURE OF ELEMENTS

10: hybrid vehicle
14: engine (drive power source for running)
16: torque converter (hydraulic transmission device)
18: automatic transmission
34: drive wheels
38: lock-up clutch (second clutch)
100: electronic control device (control device)
K0: engine connecting/disconnecting clutch (clutch)
MG: electric motor (drive power source for running)

The invention claimed is:

1. A control device of a hybrid vehicle including an engine and an electric motor as a drive power source for running, a clutch connecting/disconnecting a first power transmission path between the engine and the electric motor, and an automatic transmission coupled to the electric motor in a power transmittable manner to transmit power from the drive power source for running toward drive wheels, the hybrid vehicle being configured to perform motor running using only the electric motor as the drive power source for running with the clutch released, the control device comprising:

a drive torque increase request determining portion being configured to determine whether a request for increasing a drive torque is made during the motor running:

a hybrid control portion being configured to engage the clutch and perform start control of the engine when the request for increasing the drive torque during the motor running is made; and a shift control portion configured to perform downshift control of the automatic transmission when the request for increasing the drive torque during the motor running is made, the shift control portion being configured such that when the downshift control of the automatic transmission is performed along with the start control of the engine, engagement completion of the clutch is used as a starting point to start a rotational change of an input rotation speed of the automatic transmission toward a synchronous rotation speed after a shift, and a transmission torque capacity during the downshift control in the automatic transmission until engagement completion of the clutch being set equal to or greater than a first input torque of the automatic transmission during the motor running and less than a second input torque of the automatic transmission at the time of engagement completion of the clutch.

2. The control device of a hybrid vehicle of claim 1, wherein the first input torque of the automatic transmission during the motor running is a first output torque of the electric motor required for the motor running, and wherein the second input torque of the automatic transmission at the time of engagement completion of the clutch is a combined torque of a second output torque of the electric motor required for the motor running and for start of the engine and an output torque of the engine.

3. The control device of a hybrid vehicle of claim 1, the hybrid vehicle further comprising a second clutch connecting/disconnecting a second power transmission path between the electric motor and the automatic transmission, the control device further comprising:

a control determination portion being configured to determine whether the start control of the engine is started and whether the downshift control of the automatic transmission is started, and a control portion being configured to perform release or slip control of the second clutch when start of the start control of the engine is determined, and to engage the second clutch when the start of the start control of the engine is determined and start of the downshift control of the automatic transmission is determined.

4. The control device of a hybrid vehicle of claim 3, wherein the second clutch is a lock-up clutch included in a hydraulic transmission device.

5. The control device of a hybrid vehicle of claim 1, further comprising:

a clutch engagement determining portion being configured to calculate a synchronous rotation speed before the shift of the input rotation speed of the automatic transmission from an actual output rotation speed and a gear ratio before the shift of the automatic transmission, and to determine start of an inertia phase in the downshift process of the automatic transmission based on a first differential rotation speed between the synchronous rotation speed before the shift of the input rotation speed of the automatic transmission and an actual input rotation speed of the automatic transmission, wherein the clutch engagement determining portion determines the engagement completion of the clutch by determining the start of the inertia phase.

6. The control device of a hybrid vehicle of claim 5, wherein the clutch engagement determining portion determines the engagement completion of the clutch based on a second differential rotation speed between an actual rotation speed of the engine and an actual rotation speed of the electric motor, the control device further includes a learning control portion being configured to store a temporal difference between a first time point when the engagement completion of the clutch is determined based on the second differential rotation speed between the actual rotation speed of the engine and the actual rotation speed of the electric motor and a second time point when the start of the inertia phase is determined, and to use the temporal difference as a learned value for correcting a third time point when the engagement completion of the clutch is determined in the next start control of the engine.

7. The control device of a hybrid vehicle of claim 1, wherein the request for increasing the drive torque during the motor running corresponds to concurrent requests made as a start request for the engine associated with an increase in an accelerator opening degree and a downshift request for the automatic transmission.

* * * * *